United States Patent [19]

Battarel et al.

[11] 3,855,584

[45] Dec. 17, 1974

[54] IMPROVED REGISTER FOR PROPAGATING MAGNETIC DOMAINS

[75] Inventors: Claude Battarel, Magagnosc; Jean-Pierre Nori, Toulouse, both of France

[73] Assignee: "TECSI" (Techniques et Systemes Informatiquls), Paris, France

[22] Filed: Sept. 13, 1973

[21] Appl. No.: 397,052

[30] Foreign Application Priority Data

Sept. 13, 1972 France ............................ 72.32441

[52] U.S. Cl. .................. 340/174 MC, 340/174 FB, 340/174 SR, 340/174 TF

[51] Int. Cl. ....................... G11c 11/14, G11c 19/00

[58] Field of Search. 240/174 MC, 174 TF, 174 SR, 240/174 ZB

[56] References Cited

UNITED STATES PATENTS

| | | | |
|---|---|---|---|
| 3,417,385 | 12/1968 | Wolf | 340/174 MC |
| 3,427,603 | 2/1969 | Wolf et al. | 340/174 MC |
| 3,438,016 | 4/1969 | Spain | 340/174 MC |
| 3,474,425 | 10/1969 | Jaecklin | 340/174 MC |
| 3,685,029 | 8/1972 | Blanchard | 340/174 MC |
| 3,739,358 | 6/1973 | Battarel | 340/174 MC |

OTHER PUBLICATIONS

Spring Joint Conference, "DTPL Push Down List Memory " by Spain et al.; p. 491–498; Spring 1967.

*Primary Examiner*—Stanley M. Urynowicz, Jr.
*Attorney, Agent, or Firm*—Sughrue, Rothwell, Mion, Zinn & Macpeak

[57] ABSTRACT

A shift register in the form of a thin film magnetizable material defining a first zone of relatively low coercivity surrounded by a second zone of relatively high coercivity with the first zone extending in the direction of the axis of relative difficult magnetization and being divided from the second zone or respective opposite sides by first and second boundaries has each boundary formed by periodically repeating division formed by a first segment comprising a ridge inclined to the difficult axis by an angle of the order of 45° and connected to the remaining segment of the division in the shape of a finger having a direction parallel to the easy axis with the ridge having a variation in slope between its two ends, thus facilitating the circulation of nucleated domains.

5 Claims, 6 Drawing Figures

IMPROVED REGISTER FOR PROPAGATING MAGNETIC DOMAINS

BACKGROUND OF THE INVENTION FIELD OF THE INVENTION

Like the object of parent U.S. Pat. No. 3,739,358, the invention comes within the branch of memory devices having thin polycrystalline anisotropic magnetic layers in which a magnetic zone having low coercivity surrounded by a basic layer having higher coercivity constitutes a medium in which a magnetic domain progresses step by step under the control of a clock. It concerns an improvement in the trace defining the magnetic zone having low coercivity.

DESCRIPTION OF THE PRIOR ART

The parent patent describes a register for propagating magnetic domains which has the general form of a strip of layer having low coercivity defined on its two long edges by irregular contours having a characteristic shape, with divisions or chambers, adapted for receiving a nucleated magnetic domain at one end of the strip, for example, the left-hand end, which propagates in a broken line according to the mode: division on the upper edge - division on the lower edge - division on the upper edge - division on the lower edge . . . advancing from left to right, as a function of a clock pulse. The elementary layout of the irregular contour comprises a ridge inclined by an angle $\alpha$ on the longitudinal axis of the register or difficult magnetisation axis (where $\alpha$ is in the order of 45°), connected at its end further from the axis to a division in the shape of a finger, whose axis is perpendicular to the axis of the register.

It has been observed experimentally that this arrangement of the ridge in the form of a rectilinear segment could bring about the nucleation of interference domains in the adjacent finger-shaped division.

SUMMARY OF THE INVENTION

To overcome that disadvantage, the present addition provides for a non rectilinear shape to be imparted to said ridge, having one or several irregularities in slope capable of cancelling the interference nucleation effect.

The invention will be described in detail according to several forms of embodiment, with reference to the accompanying schematic drawings.

DESCRIPTION OF THE PREFERRED EMBODIMENT

Figure 1:
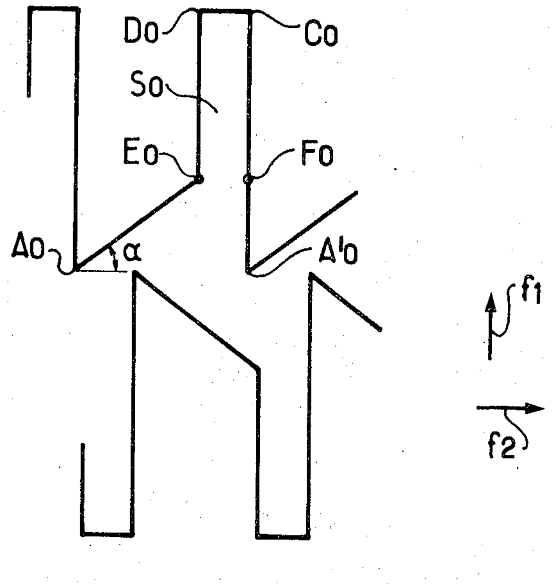
FIG. 1 (PRIOR ART)
FIG. 1 shows, by way of reference, a portion of a register for the propagation of magnetic domains according to the parent patent.

FIG. 1. A portion of a register according to the parent patent is shown, with an irregular contour on the upper edge, whose points $A_0$, $E_0$, $D_0$, $C_0$, $A'_0$, have had references corresponding to those in the parent patent assigned to them. The reference $F_0$ on the ridge $C_0$ $A'_0$, has been added at the same height as $E_0$.

The direction of the easy axis has been marked with an arrow $f_1$ ; the direction of the difficult axis has been marked with an arrow $f_2$. The points of the contour of the lower edge have not been referenced.

The discontinuity of the magnetisation along the ridge $A_0$ $E_0$ gives rise to magnetic poles, which set up a demagnetising field pointed downwards below $A_0E_0$ and pointed upwards above $A_0E_0$. The division $E_0D_0C_0F_0$ is referenced $S_0$ herebelow. The detailed examination of that demagnetising field reveals, in a zone in the vicinity of $E_0$, that is, at the base of the division $S_0$, a component of a magnetic field, along the easy axis *f*1, of several oersteds, pointed upwards, therefore favourable to the increase of the domains in the division $S_0$, as well as a component also having an intensity of several oersteds along the difficult magnetisation axis *f*2. The simultaneous action of these two components of magnetic fields combined with the action of the magnetic fields induced by the conductors (not shown) ensure the operation of the register, sets up favourable conditions for the nucleation of interefer-ence domains in the lower part of the division $S_0$. The magnetic poles on the ridge $A_0E_0$ have a density $\sigma_0$.

An examination of the magnetic field set up by the inclined ridge $A_0E_0$ which has, for example, a length of 75 microns charged with magnetic poles, has made a component of 5 Oe appear at the base of the division $S_0$ along the easy axis. That component is added to the magnetic field of the control currents, which is in the order of 11 Oe along the easy axis, gives a great resulting magnetic field, in the vicinity of the nucleation field in the division, this decreasing the operating margins of the register below the reliability threshold.

Figure 2:
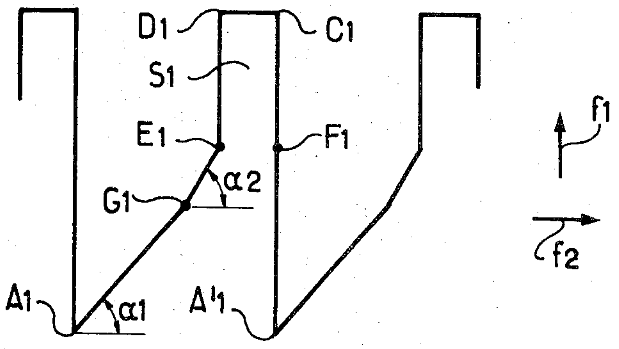
FIG. 2 shows a first modification in the ridge of the contour, comprising a relatively long first rectilinear segment followed by a greater slope segment.

FIG. 2. To overcome this state of affairs, FIG. 2 shows an upper irregular contour (the only one shown to simplify the figure) comprising a first rectilinear segment A1, G1, making an angle $\alpha 1$ with the difficult axis *f*2 of the register, followed by a second shorter rectilinear segment G1 E1 forming an angle $\alpha 2$ with the difficult axis, a division in the form of a finger E1, D1,C1,F1 (division S1) corresponding exactly to the division $S_0$ in FIG. 1.

A value in the order of 45° to 60° will be attributed to $\alpha 1$; a value greater than $\alpha 1$ will be attributed to $\alpha 2$. The ridge G1E1 will then bear magnetic poles having a density $\sigma 1$ less than $\sigma$. (figure 1). The result of this is that the demagnetising produced by that ridge will therefore be less in the case of FIG. 1, thus reducing the dangers of interference nucleation at the lower part of the division S1.

For example, for a ridge A1 G1 having a length of $60\mu$, where G1 E1 $= 15\mu$ and $\alpha 1 = 60°$ and $\alpha 2 = 75°$, the demagnetizing field produced at the base of the division S1 will have half the intensity of the case in FIG. 1.

Figure 3A:
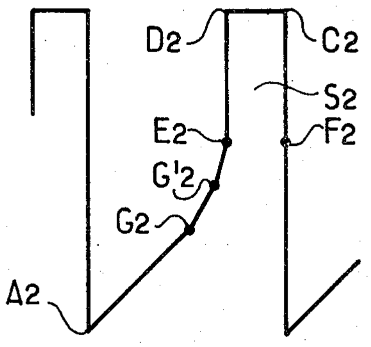
FIG. 3a shows a second modification comprising, at (a) two short segments following a long segment.
Figure 3B:
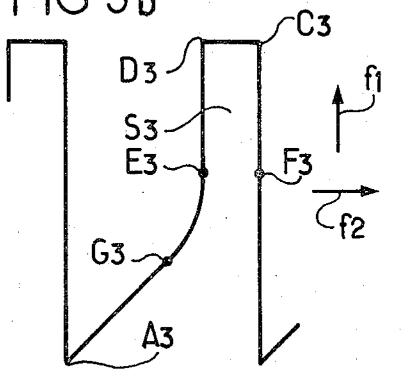
FIG. 3*b* shows a further modification where the short segments are replaced by a continuous curve.

FIGS. 3*a* 3*b* show two variants, close to each other, of the arrangement according to FIG. 2.

In variant FIG. 3*a*, the line A1 G1 E1 having two segments in FIG. 2 is replaced by a line having three segments A2 G2 G'2 E2, whose slopes go increasing from A2 towards E2.

In variant FIG. 3*b*, the two segments G2 G'2, G'2 E2, are replaced by an infinite number of segments, this leading to a first rectilinear segment A3 G3 followed by a curve G3 E3 tangent to the segment A3 G3 at G3 and tangent to the segment E3 D3 at E3. The density of the magnetic poles borne by that curve varies from $\sigma 3$ at G3 to zero at E3, thus eliminating the possibilities of interference nucleation at the base of the division S3.

The relative lengths of the lines A3 G3 and G3 E3 are not critical. An embodiment may also be provided in the form of a curve A3 E3 forming an angle $\alpha 1$ with the longitudinal axis at A3 and tangent at E3 to the straight line E3 D3.

Figure 4A:
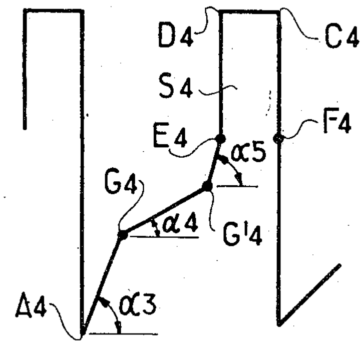
FIG. 4*a* shows a fourth modification where two end segments having a great slope are connected by a middle segment having a slighter slope.
Figure 4B:
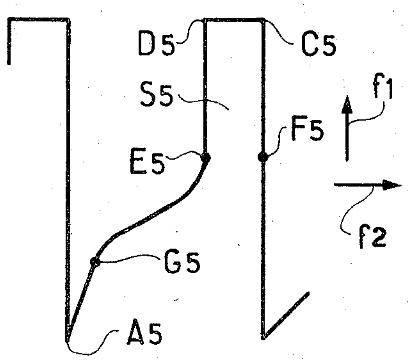
FIG. 4*b* shows a fifth modification where the original rectilinear ridge is replaced by a curve having a reversal in direction.

FIG. 4*a* and FIG. 4*b* show two variants close to each other.

In the variant FIG. 4*a*, the link between the point A4 and the point E4 is provided by three segments A4 G4 having a slope $\alpha 3$, G4 G'4 having a sope $\alpha 4$, G'4 E4 having a slope $\alpha 5$, where $\alpha 3 > \alpha 4 < \alpha 5$.

That geometrical configuration, which is more difficult to produce than the previous ones, enables a better distribution of the magnetic charges and consequently a better guiding of the domains during propagation.

In vhe variant FIG. 4*b*, the sharp angles between the segments are replaced by rounded portions ensuring better transition between the densities of magnetic poles of the various segments. A curved line having a resersal in direction is finally obtained.

S4 designates the division E4,D4,C4,F4; S5 designates the division E5,D5,C5,F5.

The dimensions of the various segments are not cricital. The following could be taken by way of a nonlimiting example: A4 G4 = 30$\mu$, G4 G'4 = 30$\mu$, G'4 E4 = 15$\mu$, where $\alpha 3 = 75°$, $\alpha 4 = 60°$ and $\alpha 5 = 75°$.

We claim:

1. In a shift register including thin film magnetizable material defining a first zone of relatively low coercivity surrounded by a second zone of relatively high coercivity with said first zone extending in the direction of the axis of relatively difficult magnetization and at right angles to the axis of relatively easy magnetization and being divided from the second zone on respective opposite sides by first and second boundaries, each boundary being formed by periodically repeating divisions comprising a ridge inclined to the longitudinal difficult axis of the register and being connected to an adjacent chamber in the shape of a finger having a direction parallel to the easy axis, the improvement wherein: said ridge has variations in slope between its two ends.

2. The register for propagating domains according to claim 1 wherein: said ridge comprises at least two rectilinear segments, whose slopes increase towards the division in the shape of a finger.

3. The register for propagating domains according to claim 1, wherein: the ridge comprises a first rectilinear portion and a second curved portion, tangent on the one hand, to the said rectilinear portion and tangent on the other hand to the direction of the easy axis.

4. The register for propagating domains according to claim 1, wherein: said ridge is subdivided into three respective segments of slopes $\alpha 3$, $\alpha 4$, $\alpha 5$ where $\alpha 3 > \alpha 4 < \alpha 5$.

5. The register for propagating domains according to claim 1, wherein: the ridge takes the form of a curved line having a reversal in direction, with a tangent parallel to the easy axis at one end.

* * * * *